(No Model.) 5 Sheets—Sheet 1.
J. W. HYATT.
STRAINER FOR GRANULAR FILTER BEDS.
No. 404,911. Patented June 11, 1889.
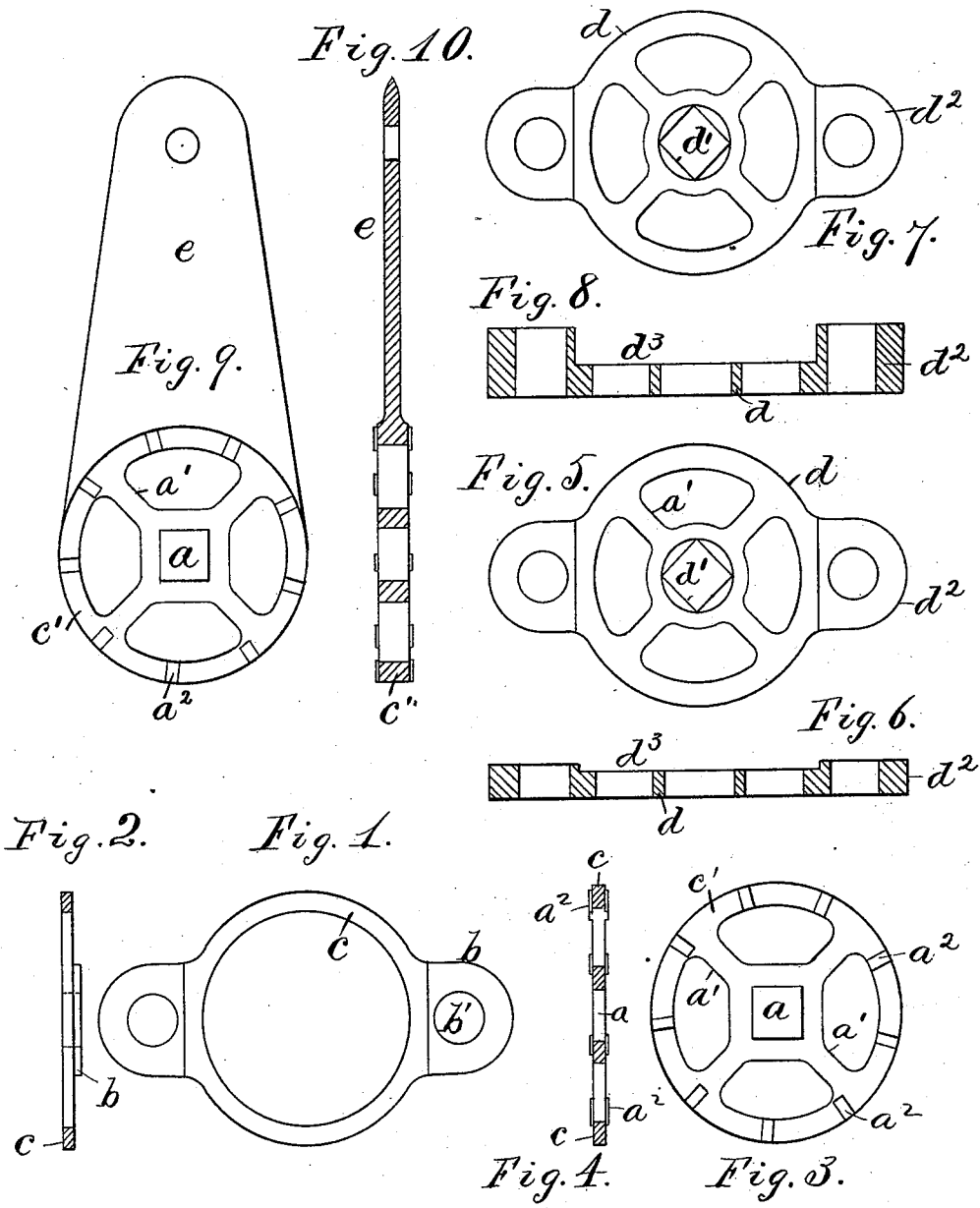

(No Model.) 5 Sheets—Sheet 2.
J. W. HYATT.
STRAINER FOR GRANULAR FILTER BEDS.
No. 404,911. Patented June 11, 1889.
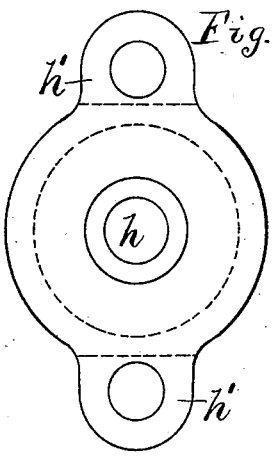
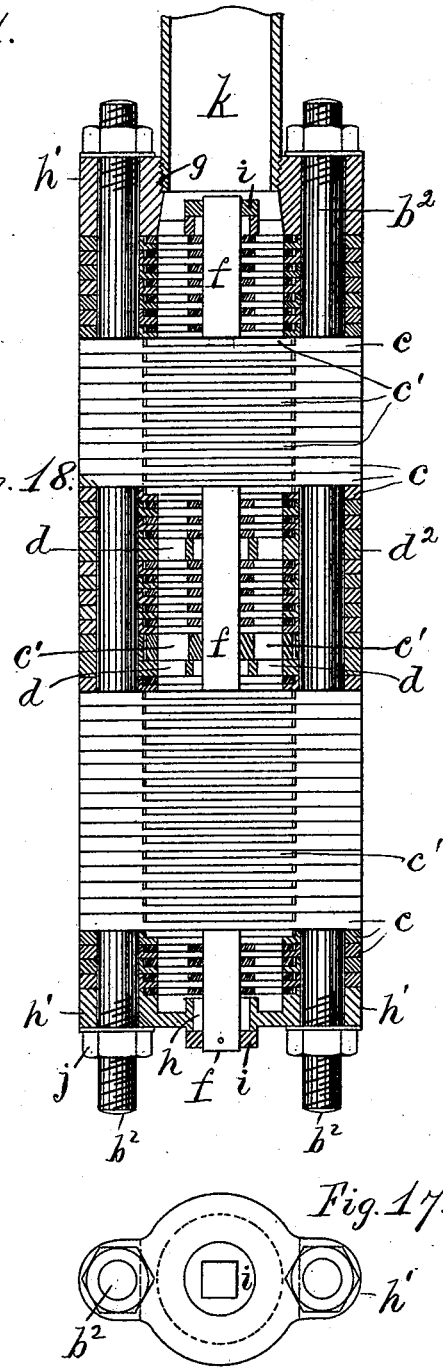
Fig. 12. Fig. 11.
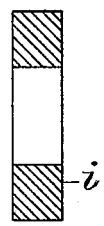
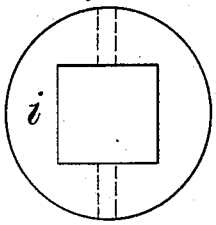
Fig. 14. Fig. 13.
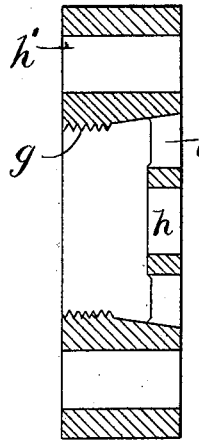
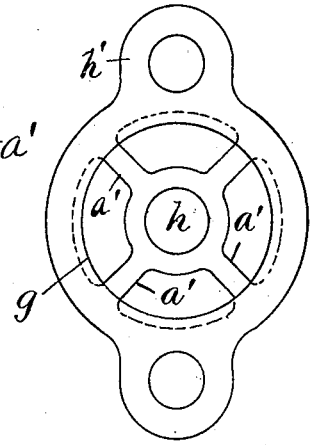
Fig. 16. Fig. 15.
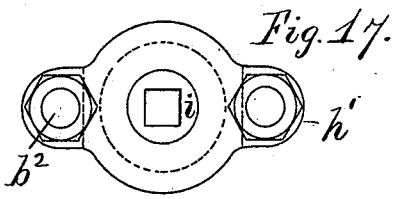
Fig. 17.
Attest:
L. Lee.
F. C. Fischer.
Inventor.
John W. Hyatt, per
Crane & Miller, attys.
N. PETERS, Photo-Lithographer, Washington, D. C.

(No Model.) 5 Sheets—Sheet 3.
J. W. HYATT.
STRAINER FOR GRANULAR FILTER BEDS.
No. 404,911. Patented June 11, 1889.
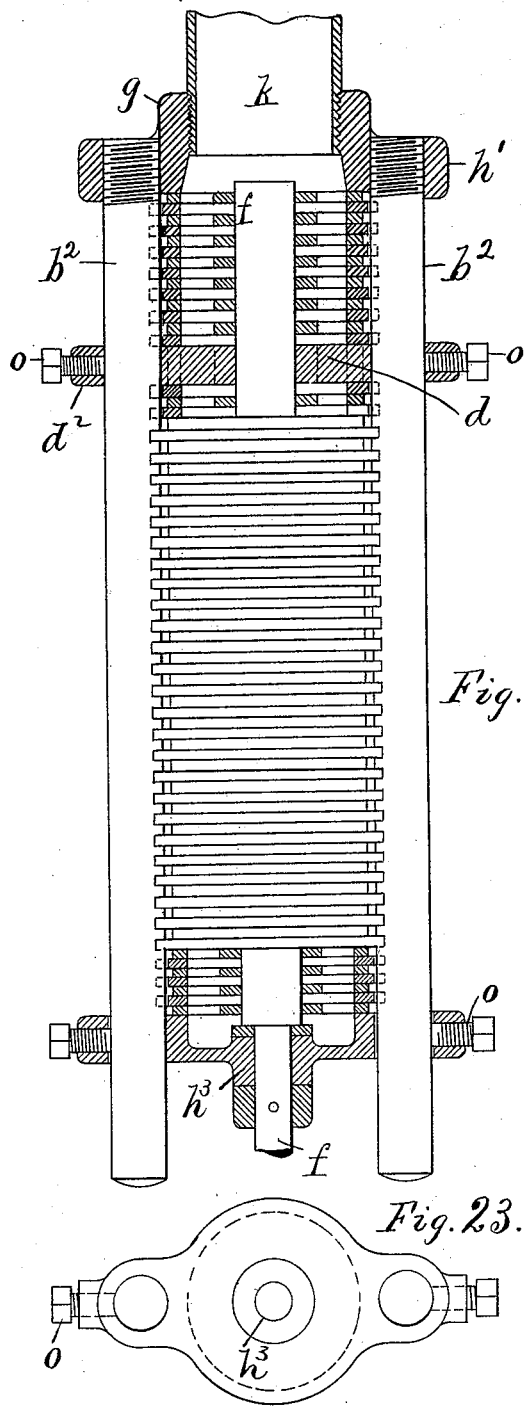
Fig. 24.
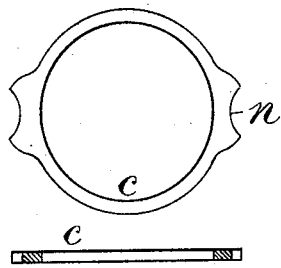
Fig. 19.
Fig. 20.
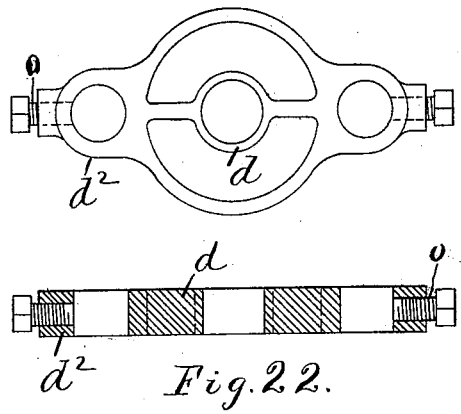
Fig. 21.
Fig. 22.
Fig. 23.
Attest:
L. Lee
F. C. Fischer
Inventor.
John W. Hyatt, per
Crane & Miller, Attys.

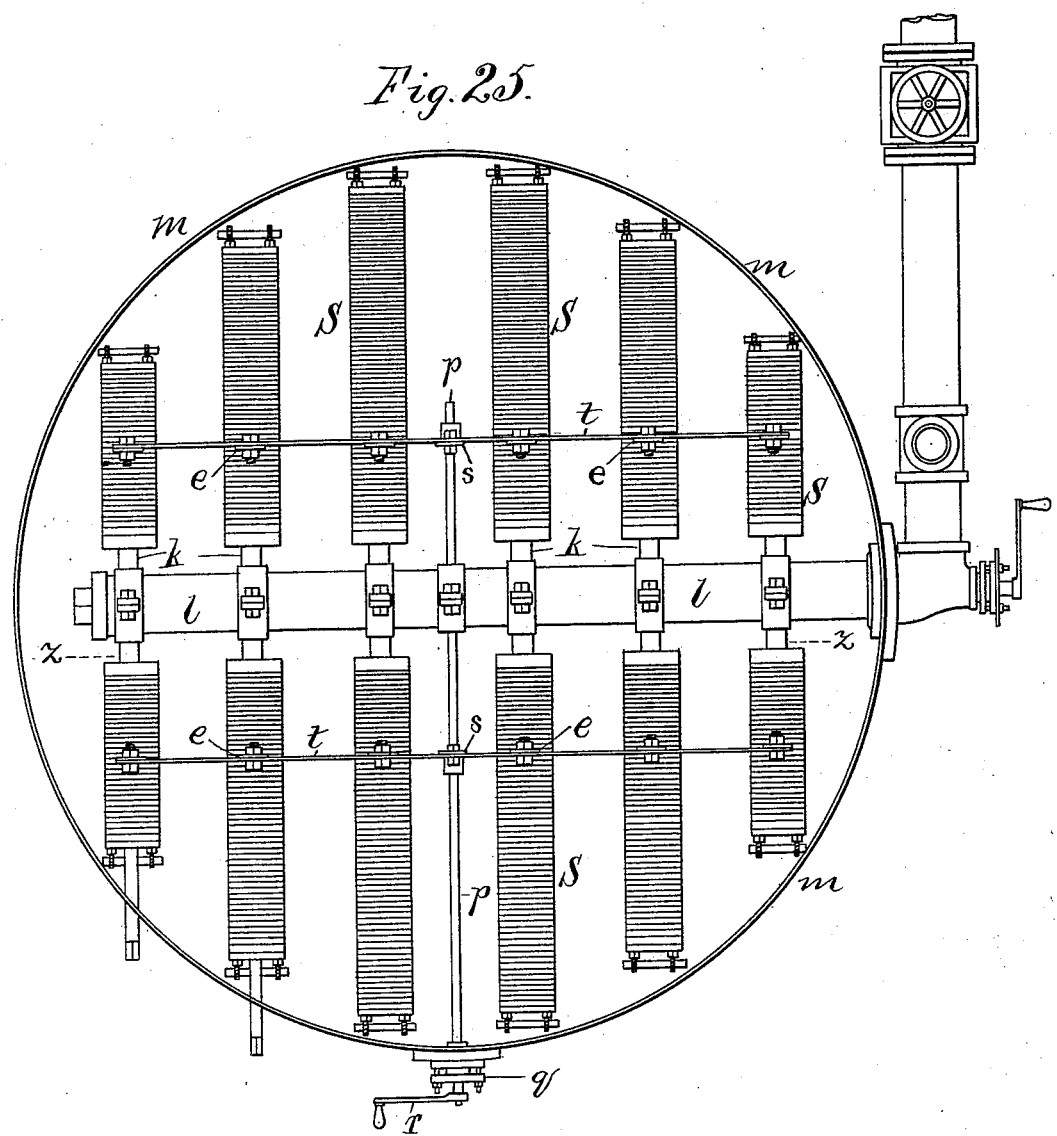

(No Model.) 5 Sheets—Sheet 5.

J. W. HYATT.
STRAINER FOR GRANULAR FILTER BEDS.

No. 404,911. Patented June 11, 1889.

Attest:
L. Lee
F. C. Fischer

Inventor.
John W. Hyatt, per
Crane & Miller, Attys.

UNITED STATES PATENT OFFICE.

JOHN W. HYATT, OF NEWARK, NEW JERSEY.

STRAINER FOR GRANULAR FILTER-BEDS.

SPECIFICATION forming part of Letters Patent No. 404,911, dated June 11, 1889.

Application filed June 15, 1888. Renewed April 17, 1889. Serial No. 307,634. (No model.)

*To all whom it may concern:*

Be it known that I, JOHN W. HYATT, a citizen of the United States, residing at Newark, Essex county, New Jersey, have invented certain new and useful Improvements in Strainers for Granular Filter-Beds, fully described and represented in the following specification and the accompanying drawings, forming a part of the same.

The object of this invention is to furnish a means by which a strainer of very fine apertures may be formed of strong and rigid materials, and the portions at one or both sides of the filtering-aperture be vibrated to remove any obstructions that may be deposited therein.

The invention consists in a series of perforated disks or collars arranged with their lateral faces in close proximity to one another, with narrow intervening spaces adapted to strain the fluid as it passes from the interior to the exterior of the disks, or the contrary.

It also consists in the combination, with such series of disks and intervening spaces, of means for oscillating the alternate disks to abrade any substance that may be deposited in the intervening spaces, and to thus dislodge or remove it by attrition.

It also consists in means for conducting the fluid from the interior of the disks, of the means for securing them together and vibrating the alternate disks, and of means for vibrating several series of such disks when arranged within a filter-casing.

The invention will be understood by reference to the annexed drawings, in which—

Figure 1 is a side view of one of the fixed collars; Fig. 2, a central section of the same; Fig. 3, a side view of one of the movable disks, and Fig. 4 a central section of the same. Fig. 5 is a side view, and Fig. 6 a central section, of one of the bridges; Fig. 7, a side view, and Fig. 8 a section, of one of the bridges to admit one of the crank-disks. Fig. 9 is a side view, and Fig. 10 a central section, of one of the crank-disks. Fig. 11 is a side view, and Fig. 12 a central section, of a bearing for the rock-shaft. Fig. 13 is a side view, and Fig. 14 a central section, of a thrust-disk for the rock-shaft. Fig. 15 is a side view, and Fig. 16 a central section, of a threaded socket for the outlet-pipe. Fig. 17 is an end view of a strainer complete with the parts constructed as shown in the previous figures. Fig. 18 is a side view of a complete strainer, with the parts shown in section on the center line where hatched. Fig. 19 is a side view, and Fig. 20 a central section, of an alternative construction for one of the fixed disks. Fig. 21 is a side view, and Fig. 22 a central section, of a regulating-disk. Fig. 23 is an end view of a rock-shaft bearing constructed like the disk in Fig. 21. Fig. 24 is a side view of a strainer constructed with the parts shown in Figs. 19 to 23, inclusive, in section where hatched. Fig. 25 is a plan of a filter-casing with a series of such strainers connected to a common outlet and provided with means for oscillating all of their movable disks when desired; and Fig. 26 is an elevation of the same filter-casing in section on line $z\, z$ in Fig. 25, with the means for oscillating the movable collars.

Figs. 1 and 2 show the fixed disk $c$, with large central opening and opposite ears $b$, provided with holes $b'$, adapted to secure them upon tie-rods $b^2$. The ears are made thicker than the body of the collar, so that when the disks are clamped together in a series by tie-rods intermediate spaces may be left for alternate movable disks.

Figs. 3 and 4 show one of the movable disks $c'$, with a central hub having square hole $a$, arms $a'$, and seats $a^2$, adapted to form a narrow intervening space when placed in contact with the fixed disks. A rock-shaft $f$ is fitted to the square hole $a$, and is provided with means for oscillating it, and thereby rotating all the movable disks.

Figure 26:
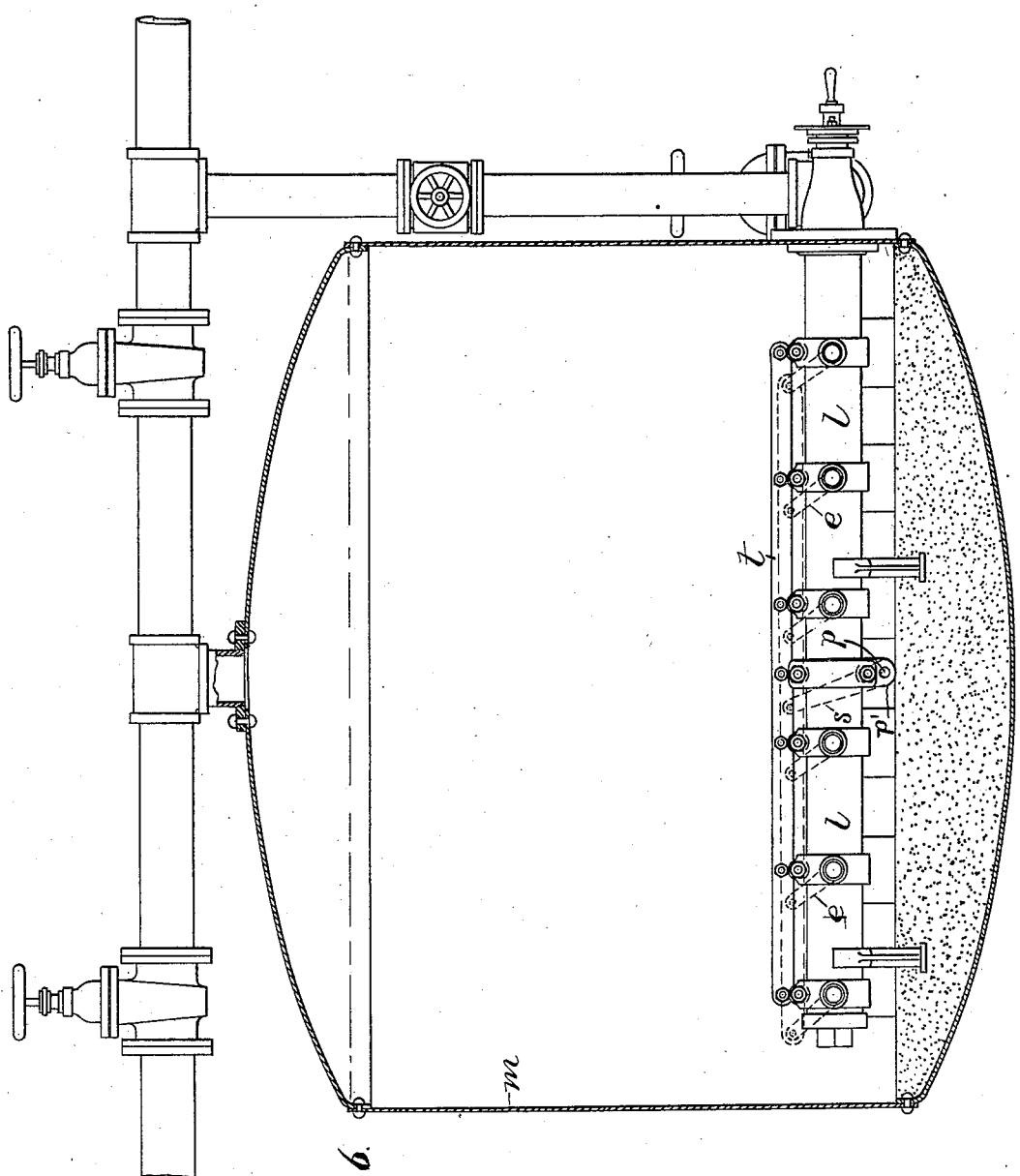

Figs. 7 and 8 show a bridge $d$, provided with a central bearing $d'$, adapted to receive the square rock-shaft loosely, and with ears $d^2$, adapted to fit the tie-rods $b^2$, and formed with a recess $d^3$ upon one side, adapted to receive a thick crank-disk $c'$, which would be used to oscillate the other disks. Such thick disk is shown in Figs. 9 and 10 provided with an arm $e$, the square hole $a$ in the center enabling the collar to grasp the rock-shaft $f$, while the arm $e$ affords the means of oscillating the shaft and all the movable disks when the arm is vibrated. The shaft passes freely through the apertures in the fixed disks $c$, and as it requires support at intervals to retain the movable disks concentric with the fixed disks bridges similar to those shown in Figs. 7 and 8 are employed, but recessed upon one side, as shown in Fig. 6, to receive a thin disk $c'$ only.

In Figs. 5 and 7 the rock-shaft, which is shown square, is represented as fitted within the central bearing and sustained by the contact of its corners with the same.

Figs. 11 and 12 show a bearing $h$ provided with lugs $h'$ to fit the tie-rods $b^2$, to serve as a support for the rock-shaft at one end of the strainer, and Figs. 15 and 16 show a similar bearing, but provided with radial arms $a'$ around a central hub, and with a screw-socket $g$ upon one side to receive the outlet-pipe of the strainer. These parts are united together to form a strainer, as shown in Fig. 18, the two bearings being connected by the tie-rods $b^2$, and the fixed and movable disks $c$ $c'$ being applied alternately between the bearings to fill the entire space. The rock-shaft is also inserted through the bearings and through the movable disks $c'$, and is provided at each end with a thrust-disk $i$. (Shown in detail in Fig. 13.)

One of the bridges $d$, adapted merely to brace the rock-shaft, is shown in section near the middle of the length of the strainer, and another bridge recessed deeply at one side to receive a thick crank-disk is shown adjacent thereto, the thick disk being provided with reference-letters at both sides to distinguish it from the thinner ones.

Nuts $j$ are shown applied to the tie-rods outside the lugs $h'$, and the latter are thus clamped upon the ears $b$ of all the fixed disks, holding them rigidly in place. The lugs $b$ are shown projected from one side of the fixed disks only to form an intermediate space for the movable disks; but such lugs may be thickened upon both sides, as the essential part of the construction is the adjustment of each of the fixed disks with an intervening space adapted to receive the movable disk $c'$, including its seats $a^2$. The movable disks are thus constantly held by the seats $a^2$ at a minute distance from the fixed disks $c$, forming narrow slits for straining-apertures, while their connection with the square rock-shaft permits of their rotation between the fixed disks, when required, to loosen and remove any obstructions that may become jammed in the narrow slits which form the straining-apertures. The arms $a'$ and central hub of the disks $c$ form the only obstruction to the passage of the fluid longitudinally within all the disks when held together by the tie-rods and rock-shaft, and the bearing $h$ at one end of the series is formed solid, as shown in Fig. 11, so that the fluid is diverted wholly toward the opposite end, where the bearing is provided with the pipe-socket $g$, in which a pipe $k$ is shown inserted in Fig. 18. The rock-shaft in such figure is shown provided with a thrust-collar $i$ at each side and would be oscillated solely by an arm affixed to the thick collar $c'$ like the arm $e$, (shown in Fig. 9;) but the rock-shaft may be projected beyond the end of the strainer and means for rotating it applied to its outer end, as shown in Figs. 24 and 25. In the latter figure each strainer is lettered S, and the fixed and movable disks are not distinguished from one another on account of their smallness. Each strainer is connected by its pipe $k$ with an outlet-trunk $l$, and the strainers are shown constructed of different lengths to fit within the cylindrical casing $m$ of the filter.

As the fixed and movable disks may be made interchangeable and the bridges and crank-disks inserted in the series at any convenient point, it is obvious that a strainer of any length may be quickly prepared from a number of such disks and bridges by using tie-rods of suitable length, and a large number of interchangeable disks and bridges may thus be kept on hand, and strainers suitable for any situation, as the interior of a circular filter, be quickly constructed.

When the fixed disks are clamped together by applying nuts to the tie-rods, it is obvious that the lugs $b$ must be made of greater thickness than the disks $c$ to prevent the pinching of the movable disks between the latter; but Figs. 19 to 24, inclusive, show a means whereby the fixed collars may be made of even thickness throughout, and thus be formed cheaply and uniformly from sheet metal by a punching or stamping process. In such construction, as shown in Figs. 19 and 20, the fixed disks may be retained in place between the tie-rods, without forming holes in the ends, by providing a notch $n$ at each side of the disk to fit the side of the rod. The series is held together, as shown in Fig. 24, by securing the tie-rods $b^2$ to the outlet-socket $g$ and clamping the bridges and bearings for the rock-shaft upon such tie-rods by means of set-screws $o$.

A single bridge $d$ is shown in section in Fig. 24, with the rock-shaft arranged diagonally in the bearing in the center of such bridge, and the bearing $h^3$ for the outer end of the rock-shaft is shown formed with a hole smaller than the rock-shaft and the shaft turned down to project through the same. By means of the set-screws $o$ the bridges and outer bearing may be adjusted after the fixed and movable disks are in place to permit the latter to rotate between the former, and the functions of the whole apparatus are thus effected without clamping the stationary disks together, as in Fig. 18. A means is also shown in Figs. 25 and 26 for oscillating simultaneously the rock-shafts of all the twelve strainers that are shown within the casing. Such means consists in a crank-shaft $p$, extended through a stuffing-box $q$ upon the casing and provided with a crank $r$ outside the same. The crank-shaft is also supported in a bearing $p'$, clamped upon the trunk $l$, and is connected with the crank $e$ of each of the strainers S by means of links *t*, which are pivoted to a series of the cranks *e* and are actuated by arms *s* upon the shaft *p*.

In Fig. 24 the rock-shaft is shown broken off outside the bearing $h^3$, but could be extended to any distance to receive the oscillating motion required, and two of the shafts are shown in dotted lines in Fig. 25 thus extended through the filter-casing *m*. By this construction each of the rock-shafts may be actuated independently, if desired. Thus in a construction where the resistances would be too great to easily agitate all the strainers at once they may be agitated separately, although it will be understood that if the delivery from the filter is obstructed by the accumulation of impurities in any of the strainers it would be difficult to tell which one needed cleansing, and it would therefore be necessary to agitate them all.

The construction I have described as my invention herein may be used for straining fluid which requires no other filtering treatment; but it is intended particularly for use within a filter-bed of granular material, as it affords a means of using a filter-bed of very fine granular material, which would be effectually prevented from escaping through the outlets, while the latter could be readily cleansed by agitating the movable disks if obstructed by any impurities. It would, however, be understood that the impurities of the fluid would be wholly arrested by the bed of granular material, and would not gain access to the strainer-apertures, and the latter would not, therefore, be fouled by any slimy substances, but only by the finer particles of the filter-bed. The abrasion of such particles by agitating the loose disks would immediately remove them from the straining-apertures and restore the efficiency of the latter.

It is obvious that the so-called "outlet-pipe" *k* may be used as an inlet-pipe and the fluid discharged outwardly through the strainer-apertures, if desired. It will also be obvious that when the strainers are located beneath a bed of sand or similar filtering material the loose disks could not be readily oscillated by reason of the pressure upon them and the tendency of the grit to enter the slits between the disks. In such a construction the current would be reversed through the filter-bed during the rocking or turning of the disks, and their agitation would thus not only remove the obstructions from the slits by attrition, but the reversed current of water would wash such obstructions from the slits when loosened by the movement of the disks.

In the above description of my invention I have used the term "disk or collar" to designate the stationary rings *c* and the movable rings *c'*, between the edges of which the fluid passes in escaping from the filter; but it is obvious that a disk could not be used without perforations for the longitudinal passage of the fluid to a common outlet.

It is obviously immaterial whether the seats $a^2$ be formed upon the stationary or movable disks or what means be used to separate the disks to form the narrow slits for the passage of the fluid. It is also immaterial whether a rock-shaft be connected with the interiors of the movable disks in the same strainer, as it is obvious that all the movable disks could be made with arms *e* to oscillate them by means outside of the strainer.

Having thus set forth my invention, what I claim herein is—

1. A strainer composed of a series of fixed and movable perforated disks arranged alternately, as described, with intervening apertures for the passage of the fluid, the perforations in the disks forming a continuous internal channel, heads to close such channel at the opposite ends of the series, an outlet from one of the heads, and means for rotating or oscillating the movable disks, as and for the purpose set forth.

2. In a strainer, the combination, with suitable tie-rods, of an outlet-socket, a series of perforated disks fixed to the tie-rods, a series of movable disks arranged alternately between the fixed disks, and means for rotating or oscillating the movable disks, as and for the purpose set forth.

3. In a strainer, the combination, with suitable tie-rods, of an outlet-socket, a series of fixed and movable perforated disks, a shaft fitted to the movable disks, and bearings secured to the tie-rods for such rock-shaft, substantially as set forth.

4. In a strainer, the combination, with suitable tie-rods, of an outlet-socket, a series of fixed and movable perforated disks, a square shaft fitted to square holes in the hubs of the movable disks, bearings secured to the tie-rods for such rock-shaft, and means for oscillating the rock-shaft, substantially as herein set forth.

5. In a strainer, the combination, with suitable tie-rods, of an outlet-socket, a series of fixed and movable perforated disks, an end bearing adjustable upon the tie-rods, a rock-shaft fitted to the end bearing and to the movable disks, and an intermediate bridge to support the rock-shaft, the outlet-socket, the fixed disks, the end bearing, and the bridge for supporting the rock-shaft being held in line at suitable distances apart by means of the tie-rods, substantially as herein set forth.

6. A strainer composed of a series of fixed and movable perforated disks arranged alternately, as described, and having seats upon their faces to separate the same, the perforations in the disks forming a continuous internal channel, heads to close such channel at the opposite ends of the series, an outlet from one of the heads, and means for rotating or oscillating the movable disks, as and for the purpose set forth.

7. In a strainer, the combination, with suitable tie-rods, of an outlet-socket, a series of fixed and movable perforated disks, a rock-shaft connecting the movable disks, and an arm upon one of said disks to oscillate them all, the outlet-socket, the fixed disks, and the end bearing being held in line at suitable distances apart by means of the tie-rods, as and for the purpose set forth.

8. The combination, with a series of outlet-strainers constructed, as described, with fixed disks and with alternate movable disks connected by a central rock-shaft, of a crank-arm $e$, projected from one of the movable disks in each strainer and adapted, when vibrated, to oscillate the rock-shaft and the movable disks in the same strainer, a link uniting the series of crank-arms, and means for oscillating such link to cleanse all the strainers simultaneously, substantially as herein set forth.

In testimony whereof I have hereunto set my hand in the presence of two subscribing witnesses.

JOHN W. HYATT.

Witnesses:
FRANK L. MORTON,
THOS. S. CRANE.